Figure 1:
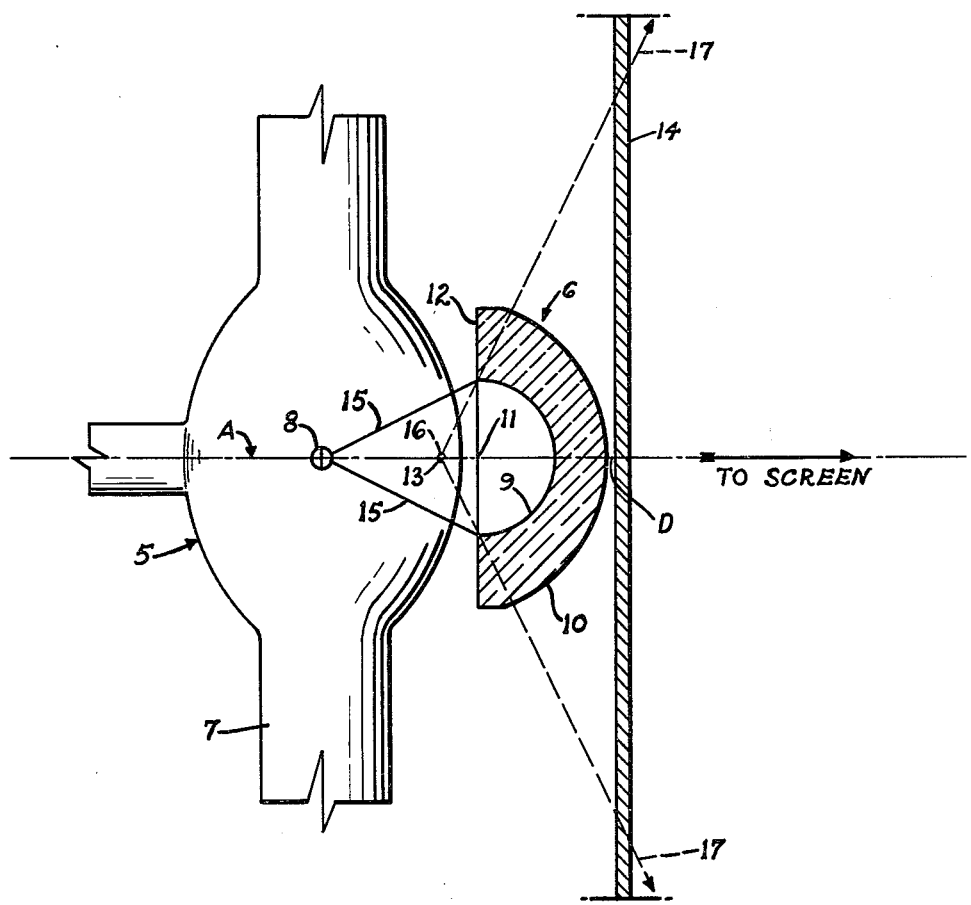

INVENTORS
BERDJ C. KALUSTYAN
LEON M. LEDERMAN
BY
Lawrence S. Epstein
ATTORNEYS

SCHEMATIC DIAGRAM OF OPTICAL ARRANGEMENT
OF POINT LIGHT SOURCE

INVENTOR.
BERDJ C. KALUSTYAN
LEON M. LEDERMAN
BY

Laurence S. Epstein
ATTORNEY

United States Patent Office  3,132,559
Patented May 12, 1964

3,132,559
OPTICAL SYSTEM FOR TRANSPARENCY PROJECTION
Berdj C. Kalustyan, Bergenfield, N.J., and Leon M. Lederman, Irvington, N.Y., assignors, by mesne assignments, to the United States of America as represented by the Secretary of the Navy
Filed Mar. 27, 1961, Ser. No. 98,723
4 Claims. (Cl. 88—24)

The invention described herein may be manufactured and used by the Government for governmental purposes without the payment of any royalty thereon.

This invention relates generally to the art of picture projection, and more particularly to the system of optics embodied in projection apparatus designed for use with color-slides, photographic film and other transparencies.

Although the present invention may be embodied in color-slide projectors generally, its conception is particularly concerned with the use thereof in a so-called point source projection system which advantageously finds application in student pilot training and/or briefing devices so as to present to the student a visual display or picture of a terrain or other object in a manner which simulates the effect of a vehicle in motion. By virtue of the point source projection system a non-programmed, wide angle, three-dimensional visual display or picture in color and with satisfactory perspective is effectively achieved. The point source projection system has application in other areas as well where a visual display is required for a specific purpose.

Briefly, in the point source projection system, the projecting element is a point source which emits a solid cone of light flux so that a transparency positioned in the path of the light flux is projected onto a reflecting screen for viewing purposes. The transparency which depicts a specific area or terrain to a reduced scale, may be and preferably is in color, and three-dimensional objects may be mounted in relief on said transparency so that said objects are projected in proper perspective upon the viewing screen. To give the illusion of motion to the observer or student pilot, the transparency is moved relative to the light source or vice versa, for example, to give the illusion of changes in altitude, the light source and transparency are moved relatively farther apart to depict increased altitude, and are moved relatively closer together to depict increased altitude, and are moved relatively closer together to depict decreased altitude.

It is the main object of the present invention to provide for use particularly in a point source projection system for transparencies a novel optical system which will advantageously provide the above-described point source of light in a relatively simple and inexpensive manner.

Another object of the invention is to provide for use particularly, but not exclusively, in a point source projection system for transparencies a novel optical system including a lens which will effectively demagnify a relatively large diameter real light source to a virtual image of minute diameter or substantially point size, whereby said virtual image of said light source appears to be the actual light source may be advantageously and effectively utilized as the means to project the transparency on a screen.

Another object is to provide for use particularly, but not exclusively, in a point source projection system for transparencies a novel optical system consisting of an absolute minimum number of component parts and which are relatively simple in construction and inexpensive to manufacture and supply.

Another object is to provide for use in transparency projection apparatus a novel optical system which utilizes a light source and a single lens for effecting projection of images from transparencies onto a viewing screen.

Figure 3:
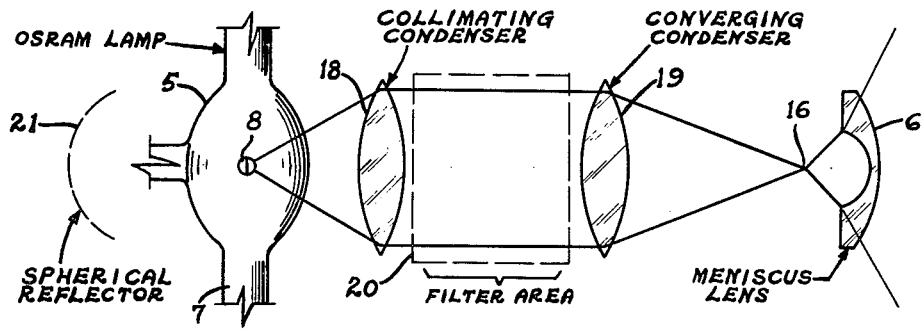
Figure 2:
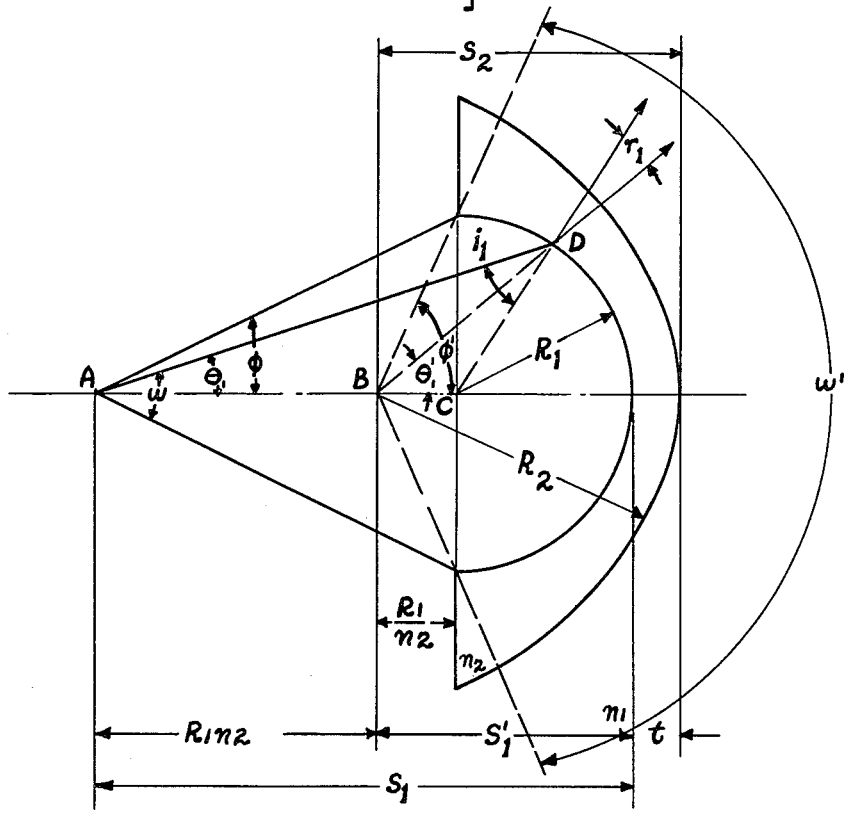

Other objects and many of the attendant advantages of this invention will be readily appreciated as the same becomes better understood by reference to the following detailed description when considered in connection with the accompanying drawings wherein:

FIG. 1 illustrates the optical system of the invention;
FIG. 2 is a diagrammatic illustration of the lens; and
FIG. 3 is a schematic showing of the projection system to obtain a point source of light.

Referring now to the figures, partly in section and on a large and exaggerated scale, the novel optical system comprehended by the present invention, which is particularly, but not exclusively, adapted for embodiment in a point source projection system for transparencies, comprises only two elements, namely, a light source indicated generally at 5, and a single lens indicated generally at 6. The light source 5 is in the form of an arc lamp 7 which is capable of producing light of a relatively high photometric brightness or luminance. The lamp 7 is positioned so that the real source of light indicated at 8 is located directly on the line of the optical axis A of the system.

The arc lamps of the desired high light intensity which are commercially available for use in the present system, produce such light which is at the source thereof of a relatively large diameter. One such arc lamp which is relatively small in overall size and has been used, for example, in the present system and is a high brightness, small diameter input light source. The latter lamp is capable of continuously delivering light of approximately 350–400 metered candle power and of an approximate diameter of .014–.016 inch at the source thereof. The lamp provides the brightest source of light available. This lamp is of particular value since it can be "de-magnified," and can be used in conjunction with optical systems for obtaining even smaller source diameters.

In a point source projection system in particular, the projection of the transparency, as well as the definition of the projected picture or image, is wholly dependent upon a light source which is not only of a relatively high intensity, but which is at the source thereof also of a minute diameter or practically point size. The smaller the diameter of the light source, the better is the projection and the projected picture definition. Accordingly, the lens 6 which is preferably located relatively close to the lamp 7 and symmetrically on opposite sides of the optical axis A, novelly serves to effectively demagnify the real light source 8 and thereby produce a virtual image of a minute diameter or substantially point size of said light source for use effectively and advantageously in the present system as the projection source. While this demagnification of the real light source 8 is obtained at the expense of a reduction in total light available from said source, the latter is of sufficient light intensity to satisfactorily enable such demagnification. It is pointed out, however, that despite said reduction in total light available from the real light source 8 due to said demagnification thereof, the luminance of the resulting virtual image is kept off the constant value of the brightness inherent in the source of light.

The lens 6, constructed as herein shown, is a negative meniscus lens. The lens is negative since it is thicker at the periphery than at the center. A negative meniscus lens collects diverging rays of light emitted by a finite point source. By making the distances between the center of the lamp 5 and the centers of curvature of the lens 6 conform to derived equations, effective size reduction and a further divergence of light is achieved.

The lens of the invention is an aplanatic negative meniscus lens. Referring to FIG. 2, the derivation of the lens is illustrated. Thus, if a point source of light A serves as the object of a negative meniscus lens and is located at a distance $$R_1 n_2 + \frac{R_1}{n_2}$$

from the first surface of the lens when the first surface has a radius of curvature, $R_1$, and the lens has an index of refraction, $n_2$, then the lens forms a virtual image B of the point source at a distance $$R_1 + \left(\frac{R_1}{n_2}\right) + t$$

from the second surface of the lens when the second surface has a radius of curvature, $$R_2 = R_1 + \left(\frac{R_1}{n_2}\right) + t$$

Further, this virtual image is smaller than the real point source object by a factor $1/n_2$.

The maximum half-angle of light output, $\phi'$, is $$\sin^{-1}\left(\frac{n_2}{\sqrt{n^2+1}}\right)$$

In addition, the brightness of the image is equal to the brightness of the virtual image B by providing a lens with a high index of refraction and the luminous intensity of this image is less than the object A by $$\frac{\sqrt{n_2^2+1}-1}{\sqrt{n_2^2+1}-n_2}$$

The aplanatic lens is free of spherical aberrations and coma. The lens is free of chromatic aberration. "$t$" equals the thickness of the lens at the optical axis and $\phi'$ equals the maximum projecting half angle emanating from the virtual point source B. Lens 6 is a solid, clear optical glass having a concave spherical surface 9 facing the lamp 7, and a convex spherical surface 10 facing away from said lamp. The center of curvature of the concave spherical surface 9 is located on the optical axis A in exact alignment with the rear flat vertical face 12 of the lens 6. The center of curvature of the convex spherical surface 10 is also located on the optical axis A, but is spaced rearwardly a predetermined distance from the point 11 as indicated at 13. This negative meniscus lens has a two-fold purpose. Its focal length and position are designed to provide an additional reduction in the size of the image and to further disperse the light. Since the lens is negative, the image formed is virtual, as shown at 16, and will appear to the observer to be emanating from a point behind the meniscus lens.

In the system just described, a transparency 14 is positioned at a selected point relatively close to and forwardly of the meniscus lens 6 and such that it intersects the optical axis A and is disposed in the path of the light flux emanating from said lens. The light flux from the real light source 8 of the energized lamp 7 is received by the meniscus lens 6, and since said lens is located quite close to said lamp, the maximum light flux is collected by the lens, as indicated by the full angular lines 15, 15. The light flux thus collected by the meniscus lens 6 is then demagnified by said lens, thereby forming a virtual image 16 of the real light source 8, which image is of a minute diameter or substantially point size, such demagnification and resulting virtual image occurring, in the illustrated embodiment, substantially at the point 13 on the optical axis A. This virtual image appears to be the point source of light. The collected and demagnified light flux is then bent by the meniscus lens 6 so that the rays of light appears to diverge from the virtual image 16 and pass through said lens in the form of a solid wide angle cone of light, as indicated by the broken angular lines 17, 17, said cone of light intersecting the optical axis A and passing through the adjacent transparency 14, thus effectively projecting said transparency onto a viewing screen (not shown) which is located a suitable distance forwardly of the transparency, such projection resulting in a wide angle coverage and good definition and luminance of the projected picture or image on said screen. The distance D between the meniscus lens 6 and the transparency 14 may be varied, but the focus remains fixed.

FIG. 3 illustrates the optical arrangement of a point light source. The real source 8 is a point light source and has been obtained as small as 0.0035 inch having an intensity of approximately 18 candles along the optical axis. Light coverage is in excess of a complete hemisphere. Output in a particular direction varies directly as the cosine of the angle from the optical axis to the direction in question. This can approach the object within 0.72 inch. Any high numerical aperture condenser lens 18 is utilized in this optical system, although a single element quartz condenser lens is preferred. This is because a lens of this type can withstand intense heat. The condenser lens 18 collimates the light rays from the lamp and transmits them as a collimated beam to a high numerical aperture microscope objective lens 19. This converging lens forms a virtual image at a single point 16. A convenient place for the filters 20, for any desired purpose such as to absorb heat, for color compensation, for special effects, is that following the condenser lens 18 where the light is collimated. Fog and haze effects are also produced here. Where the optical efficiency is to be increased, a spherical mirror reflector 21 is positioned behind the source of light 5.

There is thus provided a novel simplified optical system which utilizes a single lens for effectively projecting transparencies onto a viewing screen. The lens, being a negative meniscus lens, advantageously and effectively provides for demagnification of a real light source so that the resulting minute diameter or substantially point size virtual image of said light source effectively serves as the projection source, thus enabling wide angle projection of transparencies onto a viewing screen with good picture definition and luminance, and advantageously providing for use of the novel simplified optical system in a point source projection system for transparencies. The light rays actually pass through the condensers and the virtual image is obtained at 16 from the real image at 8.

Obviously many modifications and variations of the present invention are possible in the light of the above teachings. It is therefore to be understood that within the scope of the appended claims the invention may be practiced otherwise than as specifically described.

What is claimed is:

1. An optical system for use in the projection of transparencies onto a viewing screen, comprising a transparency, a relatively high intensity continuous point light source of illumination, the physical size of said light being decreased by the factor $1/n_2$ and a negative meniscus-shaped projection lens positioned between said transparency and light source and located in close proximity to said light source, said lens having a concave spherical surface facing said light source and a convex spherical surface facing away from said light source.

2. An optical system for use in transparency projection apparatus, comprising a transparency, a lamp capable of producing light of a relatively high intensity, the physical size of said light decreased by the factor $1/n_2$ of said light being located on the optical axis of said system and being of a relatively large diameter in magnitude of .020 inch, and a negative meniscus-shaped projection lens intersecting said optical axis and located in close proximity to said lamp to receive the light flux from said light source, said lens having a concave spherical surface facing said lamp and a convex spherical surface facing away from said lamp, said concave spherical surface having its center of curvatures located at a predetermined position on said optical axis, said convex spherical surface having its center of curvature located on said optical axis and spaced there along toward said lamp a predetermined distance from said first-named center of curvature, said lens serving to demagnify said light source and thereby provide a virtual minute diameter image of said light source on said optical axis at a predetermined position between said lamp and lens for projection of a transparency positioned in projecting relation to said lens onto a viewing screen.

3. An optical system as defined in claim 2 wherein said virtual image substantially appears at the center of curvature of said convex spherical surface, and said concave spherical surface terminates in a rear flat surface on said lens perpendicular to said optical axis and aligned with the center of curvature of said concave surface.

4. An optical system for use in transparency projection apparatus, comprising a transparency, a lamp capable of producing light of a relatively high intensity, the physical size of said light being decreased by the factor $1/n_2$ of said light being located on the optical axis of said system and being of a relatively large diameter in magnitude of .020 inch, and a projection lens positioned between said transparency and lamp and intersecting said optical axis and located in close proximity to said lamp to receive the light flux from said light source and demagnify the same so as to provide on said optical axis and between said lamp and said lens a virtual image of a minute diameter of said light source, said lens having a concave spherical surface facing said lamp, the center of curvature of said concave surface being located at a predetermined position on said optical axis, and said lens having another surface facing away from said lamp and formed to cause the light rays to diverge from said virtual image and emanate from said lens so as to cover a relatively large area of transparency positioned in projecting relation to said lens, said transparency being in fixed focus at all times.

References Cited in the file of this patent

UNITED STATES PATENTS

| | | |
|---|---|---|
| 976,143 | Bostock | Nov. 22, 1910 |
| 1,202,753 | Patterson | Oct. 24, 1916 |
| 1,928,255 | Holst | Sept. 26, 1933 |
| 2,165,305 | Ruths | July 11, 1939 |
| 2,225,485 | Rantsch | Dec. 17, 1940 |
| 2,456,711 | Knutson et al. | Dec. 21, 1948 |

OTHER REFERENCES

Southall, James P. C.: Mirrors, Prisms and Lenses, N.Y., The Macmillan Co.; 1923; page 618.

Dull, Metcalf, and Williams: Modern Physics; N.Y., Henry Holt & Co.; 1960; page 345.